US010605273B2

(12) United States Patent
Nakamura et al.

(10) Patent No.: US 10,605,273 B2
(45) Date of Patent: Mar. 31, 2020

(54) MOTOR CONTROL DEVICE

(71) Applicant: FANUC CORPORATION, Yamanashi (JP)

(72) Inventors: Tsutomu Nakamura, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/209,118

(22) Filed: Dec. 4, 2018

(65) Prior Publication Data
US 2019/0219070 A1 Jul. 18, 2019

(30) Foreign Application Priority Data

Jan. 16, 2018 (JP) .................................. 2018-005187

(51) Int. Cl.
*F15B 11/04* (2006.01)
*B30B 15/16* (2006.01)
(Continued)

(52) U.S. Cl.
CPC ................ *F15B 11/04* (2013.01); *B21J 5/00* (2013.01); *B30B 15/161* (2013.01); *B30B 15/166* (2013.01); *B30B 15/26* (2013.01); *F04B 49/06* (2013.01); *F15B 11/028* (2013.01); *G05B 7/02* (2013.01); *G05B 19/19* (2013.01); *G05D 3/12* (2013.01); *F15B 21/087* (2013.01); *F15B 2211/20515* (2013.01);
(Continued)

(58) Field of Classification Search
CPC ..................................................... B21D 24/02
See application file for complete search history.

(56) References Cited

U.S. PATENT DOCUMENTS 4,458,189 A    7/1984  Dollerschell
7,506,530 B2 * 3/2009  Iwashita ................ B21D 24/02
                                                        72/20.2
(Continued)

FOREIGN PATENT DOCUMENTS

JP    62-234700    10/1987
JP    9-70700      3/1997
(Continued)

*Primary Examiner* — Thomas E Lazo
*Assistant Examiner* — Matthew Wiblin
(74) *Attorney, Agent, or Firm* — Wenderoth, Lind & Ponack, L.L.P.

(57) ABSTRACT

A motor control device includes a pressure command unit calculating a pressure command for commanding pressure generated in a pressure control object, a pressure detection unit detecting the pressure generated in the pressure control object, a pressure control unit calculating a speed command for pressure control for the servo motor, based on the calculated pressure command and the detected pressure, and a servo control unit controlling speed of the servo motor, based on the calculated speed command. The pressure control unit performs an integral operation. When a direction of increasing pressure in the integral operation is defined as a positive direction in the integral operation, and a direction of decreasing the pressure is defined as a negative direction, a median between an upper limit in the positive direction and a lower limit in the negative direction in the integral operation is larger than zero.

6 Claims, 5 Drawing Sheets

(51) Int. Cl.
*B30B 15/26* (2006.01)
*B21J 5/00* (2006.01)
*G05B 19/19* (2006.01)
*G05D 3/12* (2006.01)
*F04B 49/06* (2006.01)
*F15B 11/028* (2006.01)
*G05B 7/02* (2006.01)
*F15B 21/08* (2006.01)

(52) U.S. Cl.
CPC .............. *F15B 2211/20546* (2013.01); *F15B 2211/633* (2013.01); *F15B 2211/6309* (2013.01); *F15B 2211/6651* (2013.01); *F15B 2211/6653* (2013.01); *F15B 2211/6654* (2013.01); *F15B 2211/6656* (2013.01); *F15B 2211/75* (2013.01)

(56) References Cited

U.S. PATENT DOCUMENTS

| | | | | |
|---|---|---|---|---|
| 7,739,894 | B2* | 6/2010 | Suzuki | B21D 24/02 72/453.13 |
| 9,501,052 | B2* | 11/2016 | Kohno | G05B 19/041 |
| 2007/0084264 | A1* | 4/2007 | Iwashita | B21D 24/02 72/350 |
| 2008/0066515 | A1* | 3/2008 | Iwashita | B21D 24/02 72/351 |
| 2009/0230910 | A1* | 9/2009 | Hishikawa | B21D 24/02 318/591 |
| 2015/0300378 | A1* | 10/2015 | Udagawa | E02F 3/32 60/449 |
| 2015/0360274 | A1* | 12/2015 | Kohno | B21D 24/14 72/20.2 |
| 2016/0061236 | A1* | 3/2016 | Tho | F04B 49/065 60/327 |
| 2017/0366606 | A1* | 12/2017 | Ben-Shaul | H04L 67/1097 |

FOREIGN PATENT DOCUMENTS

| | | |
|---|---|---|
| JP | 2001-263254 | 9/2001 |
| JP | 2004-301188 | 10/2004 |
| JP | 2004-308736 | 11/2004 |
| JP | 2007-160356 | 6/2007 |
| JP | 4015139 | 11/2007 |
| JP | 4143343 | 9/2008 |
| JP | 5940106 | 6/2016 |

* cited by examiner

MOTOR CONTROL DEVICE

This application is based on and claims the benefit of priority from Japanese Patent Application No. 2018-005187, filed on 16 Jan. 2018, the content of which is incorporated herein by reference.

BACKGROUND OF THE INVENTION

Field of the Invention

The present invention relates to a motor control device configured to control a servo motor for driving an object to be pressure controlled, and to perform pressure control for controlling pressure generated in the object to be pressure controlled.

Related Art

Forging machines for pressing, forging, bending, rolling, cutting, crimping (riveting) and the like are known. Such a forging machine includes a machine including a slide (a movable unit) having one die and a bolster (a fixed unit) having the other die, and the machine drives and controls the slide or a die cushion mechanism on the bolster side. In the case of driving and controlling the slide, such a forging machine brings the one die into contact with an object mounted on the other die, and performs pressure control by using the slide for controlling the pressure acting on the object at a constant level. In the case of driving and controlling the die cushion mechanism on the bolster side, such a forging machine reciprocates the slide with a predetermined stroke, and makes the die cushion mechanism stand by at a standby position, until the one die is brought into contact with the object mounted on the other die. After the one die is brought into contact with the object, the forging machine moves the die cushion mechanism together with the slide, thereby performing pressure control for controlling the pressure acting on the object at a constant level.

Such a forging machine includes a motor control device for performing pressure control, by using a ball screw for driving the slide or the die cushion mechanism on the bolster side, and a servo motor for driving the ball screw so as to control the servo motor.

Such a forging machine includes a motor control device for performing pressure control, by using a hydraulic pressure generation mechanism configured with a hydraulic pump and a hydraulic cylinder for driving a slide or a die cushion mechanism on a bolster side, and also using the servo motor for driving the hydraulic pump in the hydraulic pressure generation mechanism so as to control the servo motor (refer to Patent Document 1 and Patent Document 2, as examples). The hydraulic pump is driven by the servo motor to supply hydraulic oil to the hydraulic cylinder or discharge hydraulic oil from the hydraulic cylinder. This increases and decreases the pressure of the hydraulic oil supplied to the hydraulic cylinder, whereby the hydraulic cylinder drives the slide or the die cushion mechanism on the bolster side.

Patent Document 1: Japanese Unexamined Patent Application, Publication No. 2001-263254

Patent Document 2: Japanese Unexamined Patent Application, Publication No. 2007-160356

SUMMARY OF THE INVENTION

In general, a motor control device uses pressure control including integral (I) control, for example, proportional-integral (PI) control or proportional-integral-derivative (PID) control, in order to asymptotically bring the final pressure error to zero in feedback control. A forging machine has an elastic body having elastic properties between a slide and a die cushion mechanism. Therefore, pressure may overshoot or undershoot during the pressure control including integral (I) control. Especially, if pressure undershoots during the pressure control, a molded product may deteriorate in quality, or the machine may be broken. For example, some of hydraulic pumps (object to be pressure controlled) may be damaged when the hydraulic pressure falls to a negative value.

The object of the present invention is to provide a motor control device for suppressing the pressure in an object to be pressure controlled from undershooting.

(1) A motor control device (for example, a motor control device 1 to be described below) according to the present invention is configured to control a servo motor (for example, a servo motor 2 to be described below) configured to drive an object to be pressure controlled (for example, a hydraulic pressure generation mechanism (a hydraulic pump and a hydraulic cylinder) 5 to be described below), and to perform pressure control for controlling pressure generated in the object to be pressure controlled. The motor control device includes a pressure command unit (for example, a pressure command unit 20 to be described below) configured to calculate a pressure command for commanding the pressure generated in the object to be pressure controlled, a pressure detection unit (for example, a pressure detection unit 22 to be described below) configured to detect the pressure generated in the object to be pressure controlled, a pressure control unit (for example a pressure control unit 24 to be described below) configured to calculate a speed command for the pressure control for the servo motor, on the basis of the pressure command calculated by the pressure command unit and the pressure detected by the pressure detection unit, and a servo control unit (for example, a servo control unit 40 to be described below) configured to control speed of the servo motor, on the basis of the speed command for the pressure control calculated by the pressure control unit. The pressure control unit performs an integral operation. When a direction of increasing pressure in the integral operation is defined as a positive direction in the integral operation, and a direction of decreasing the pressure is defined as a negative direction, a median between an upper limit in the positive direction and a lower limit in the negative direction in the integral operation is larger than zero.

(2) In the motor control device according to (1), the lower limit in the integral operation by the pressure control unit may be zero.

(3) In the motor control device according to (1) or (2), the upper limit in the integral operation by the pressure control unit may be set changeably.

(4) The motor control device according to (3) may further include a speed command unit (for example, a speed command unit 10 to be described below) configured to calculate a speed command for speed control for the servo motor, and a selection unit (for example, a selection unit 30 to be described below) configured to select a speed command in the direction of decreasing the pressure generated in the object to be pressure controlled from the speed command for speed control calculated by the speed command unit and the speed command for pressure control calculated by the pressure control unit. The servo control unit may control the speed of the servo motor, on the basis of the speed command selected by the selection unit.

(5) In the motor control device according to (4), the upper limit in the integral operation by the pressure control unit (24) may be set to the speed command for speed control.

(6) In the motor control device according to any one of (1) to (5), the object to be pressure controlled may be a hydraulic pressure generation mechanism (for example, a hydraulic pressure generation mechanism 5 to be described below) configured with a hydraulic pump to be driven by the servo motor and a hydraulic cylinder to be driven with hydraulic oil supplied by the hydraulic pump so as to drive a driven body. The pressure generated in the object to be pressure controlled may correspond to hydraulic pressure of the hydraulic oil in the hydraulic pressure generation mechanism.

The present invention enables to provide a motor control device for suppressing the pressure in the object to be pressure controlled from undershooting.

DETAILED DESCRIPTION OF THE INVENTION

Figure 1:
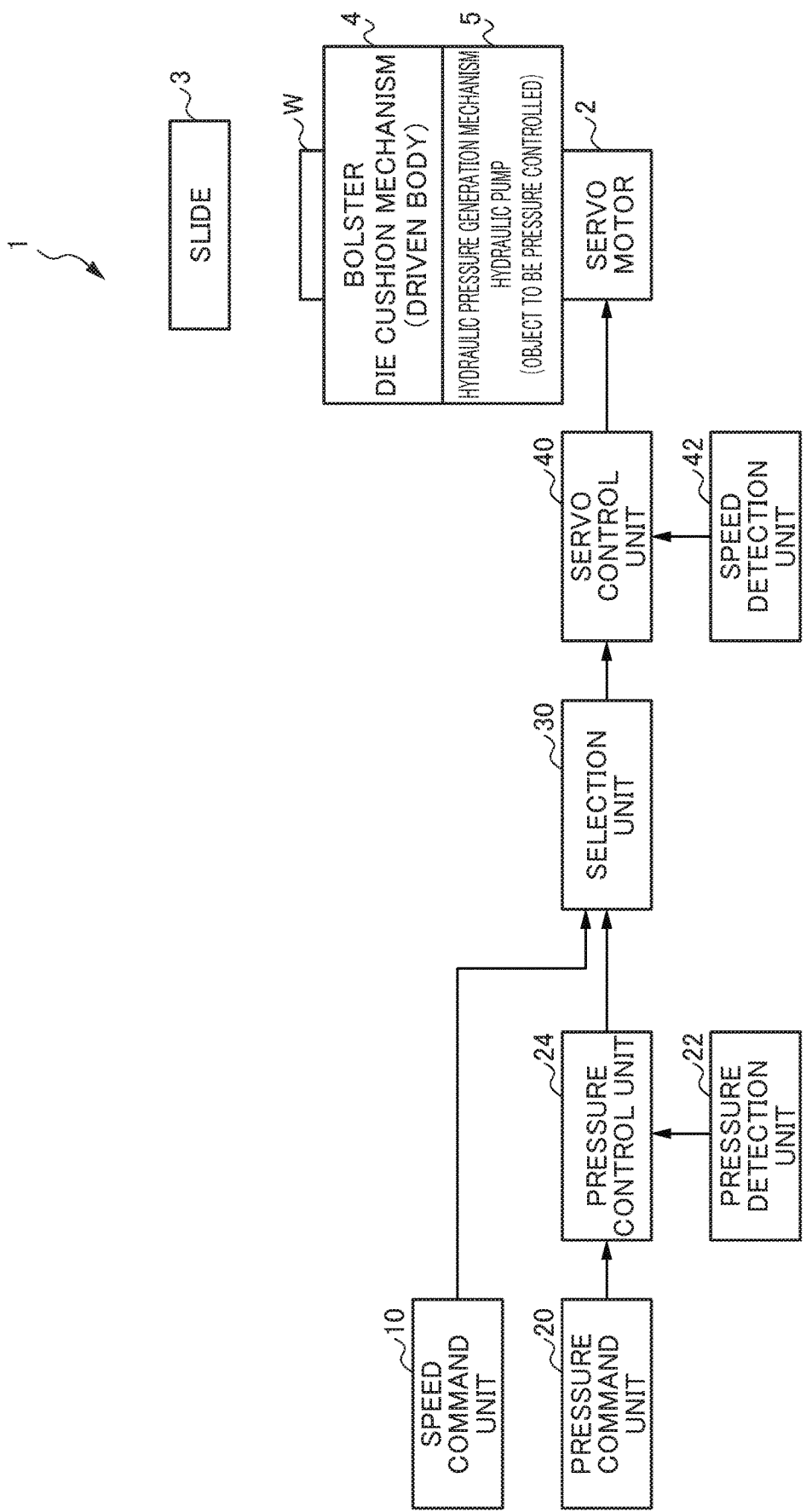
FIG. 1 is a diagram illustrating a configuration of motor control device according to the present embodiment.

One embodiment of the present invention is described below with reference to the attached drawings. It is noted that in the drawings, the same reference numerals are assigned to the same or corresponding parts.

FIG. 1 is a diagram illustrating a configuration of a motor control device according to the present embodiment. As shown in FIG. 1, a motor control device 1 controls a servo motor 2 in a press machine as an example.

In a press machine, a slide 3 is reciprocated with a predetermined stroke so that a workpiece (object) W is sandwiched by the slide 3 and a bolster, and thereafter a die cushion mechanism (hereinafter, also referred to as a driven body) 4 on the bolster side is moved together with the slide 3 whereby pressure is applied to the workpiece W to deform the workpiece W. The die cushion mechanism 4 on the bolster side is driven by a hydraulic pressure generation mechanism 5, and the hydraulic pressure generation mechanism 5 is driven by the servo motor 2.

The hydraulic pressure generation mechanism 5 is configured with a hydraulic pump and a hydraulic cylinder. The hydraulic pump is driven by the servo motor 2 to supply hydraulic oil to the hydraulic cylinder, or to discharge hydraulic oil from the hydraulic cylinder. This increases and decreases the pressure of the hydraulic oil supplied to the hydraulic cylinder, whereby the hydraulic cylinder drives the die cushion mechanism 4 on the bolster side.

The motor control device 1 controls the servo motor 2 for driving the hydraulic pump of the hydraulic pressure generation mechanism (hereinafter, also referred to as an object to be pressure controlled) 5. In this case, the motor control device 1 performs two types of control including speed control for controlling the speed of the servo motor 2 and pressure control (force control) for controlling the pressure (force) of the hydraulic oil in the hydraulic pressure generation mechanism 5.

As shown in FIG. 1, the motor control device 1 includes a speed command unit 10, a pressure command unit 20, a pressure detection unit 22, a pressure control unit 24, a selection unit 30, a servo control unit 40 and a speed detection unit 42.

The speed command unit 10 calculates a speed command (a speed command for speed control) for commanding the rotation speed of the servo motor 2 (in other words, the speed of the driven body 4). The speed command unit 10 calculates the speed command for speed control accordance with the program or the command input by a host control device, an external input device or the like not shown.

The pressure command unit 20 calculates a pressure command (a force command) (a pressure command for pressure control) for commanding pressure of the hydraulic oil in the hydraulic pressure generation mechanism 5 (in other words, force acting on the workpiece W by the driven body 4, further in other words, pressure acting on the driven body 4 by the workpiece W). The pressure command unit 20 calculates the pressure command for pressure control in accordance with the program or the command input by a host control device, an external input device or the like not shown.

The pressure detection unit 22 is a pressure sensor provided in the hydraulic pressure generation mechanism 5, as an example. The pressure detection unit 22 detects the pressure of the hydraulic oil in the hydraulic pressure generation mechanism 5. The pressure of the hydraulic oil in the hydraulic pressure generation mechanism 5 corresponds to the force acting on the workpiece W by the driven body 4, in other words, the pressure acting on the driven body 4 by the workpiece W. That is, the pressure detection unit 22 detects the pressure acting on the driven body 4. The detected pressure as used as pressure feedback (pressure FB).

The pressure control unit 24 calculates a speed command for pressure control for the servo motor 2 on the basis of the pressure command calculated by the pressure command unit 20 and the pressure FB detected by the pressure detection unit 22. Specifically, the pressure control unit 24 calculates the pressure error between the pressure command calculated by the pressure command unit 20 and the pressure FB detected by the pressure detection unit 22, and performs, to the pressure error, control including integral (I) control, for example, proportional-integral (PI) control or proportional-integral-derivative (PID) control, thereby calculating the speed command for pressure control.

The press machine has an elastic body having elastic properties between the slide 3 and the die cushion mechanism 4. Therefore, the pressure may overshoot or undershoot during such pressure control including integral (I) control. If the pressure overshoots or undershoots, a molded product may have lower quality, or the machine may be broken. In an example, some hydraulic pumps serving as a hydraulic pump of the hydraulic pressure generation mechanism 5 may be damaged when the hydraulic pressure thereof falls to a negative value. In general, an output value by an integrator for performing an integral operation can be a positive value and a negative value. In addition, a driving signal for the servo motor can be not only a positive value but also a negative value. As described above, some hydraulic pumps serving as a hydraulic pump of the hydraulic pressure generation mechanism 5 may be damaged when the hydraulic pressure thereof falls to a negative value. In such a hydraulic pump, the hydraulic pressure needs to be kept at a positive value.

Figure 5:
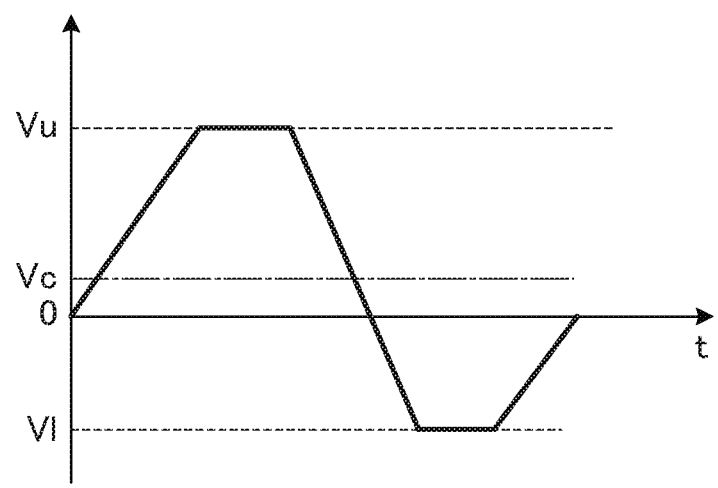
FIG. 5 is a schematic diagram illustrating an integral operation range of a pressure control unit in the motor control device according to the modification of the present embodiment.

With regard to this point, in the present embodiment, when the direction of increasing the pressure in the integral operation by the pressure control unit 24 is defined as a positive direction in the integral operation, and the direction of decreasing the pressure is defined as a negative direction, a median Vc between an upper limit Vu in the positive direction and a lower limit V1 in the negative direction (Vc=(Vu+V1)/2) in the integral operation by the pressure control unit 24 is set larger than zero, as shown in FIG. 5. This enables to suppress the pressure generated in the hydraulic pump of the hydraulic pressure generation mechanism 5 from undershooting. Furthermore, the lower limit V1 the integral operation by the pressure control unit 24 is set to zero. This further suppresses the pressure generated in the hydraulic pump of the hydraulic pressure generation mechanism 5 from undershooting, thereby enabling to avoid the pressure in the hydraulic pump of the hydraulic pressure generation mechanism 5 from falling to a negative value. As a result, the hydraulic pump of the hydraulic pressure generation mechanism 5 is avoided from being damaged.

The upper limit Vu in the integral operation by the pressure control unit 24 is set to the speed command for speed control. This enables to suppress the pressure in the hydraulic pump of the hydraulic pressure generation mechanism 5 from overshooting, thereby enabling to avoid the generation of an excessive pressure in the hydraulic pump of the hydraulic pressure generation mechanism 5. As a result, the hydraulic pump of the hydraulic pressure generation mechanism 5 is avoided from being damaged.

The selection unit 30 switches between speed control and pressure control by selecting either one of speed control and pressure control. Specifically, the selection unit 30 compares the speed command for speed control calculated by the speed command unit 10 and the speed command for pressure control calculated by the pressure control unit 24, and selects the smaller one. That is, the selection unit 30 selects the speed command in the direction of decreasing the pressure of the hydraulic oil in the hydraulic pressure generation mechanism 5.

The speed detection unit 42 is an encoder disposed in the servo motor 2, as an example. The speed detection unit 42 detects the rotation speed of the servo motor 2. The rotation speed of the servo motor 2 corresponds to the speed of the driven body 4. That is, the speed detection unit 42 detects the speed of the driven body 4. The detected speed is used as speed feedback (speed FB).

The servo control unit 40 calculates a torque command for the servo motor 2 on the basis of the speed command selected by the selection unit 30 and the speed FB detected by the speed detection unit 42, and then generates a driving current for the servo motor 2 on the basis of the calculated torque command. In an example, the servo control unit 40 calculates the speed error between the speed command selected by the selection unit 30 and the speed FB detected by the speed detection unit 42, and performs PI control to the speed error, thereby calculating the torque command.

The motor control device 1 is configured with an arithmetic processor, for example, DSP (Digital Signal Processor) or FPGA (Field-Programmable Gate Array). The various functions (the speed command unit 10, the pressure command unit 20, the pressure control unit 24, the selection unit 30, and the servo control unit 40) of the motor control device 1 are realized when predetermined software (programs) stored in, for example, a storage unit are executed. The various functions of the motor control device 1 may be realized by cooperation of hardware and software, or may be realized only by hardware (an electronic circuit).

Figure 4:
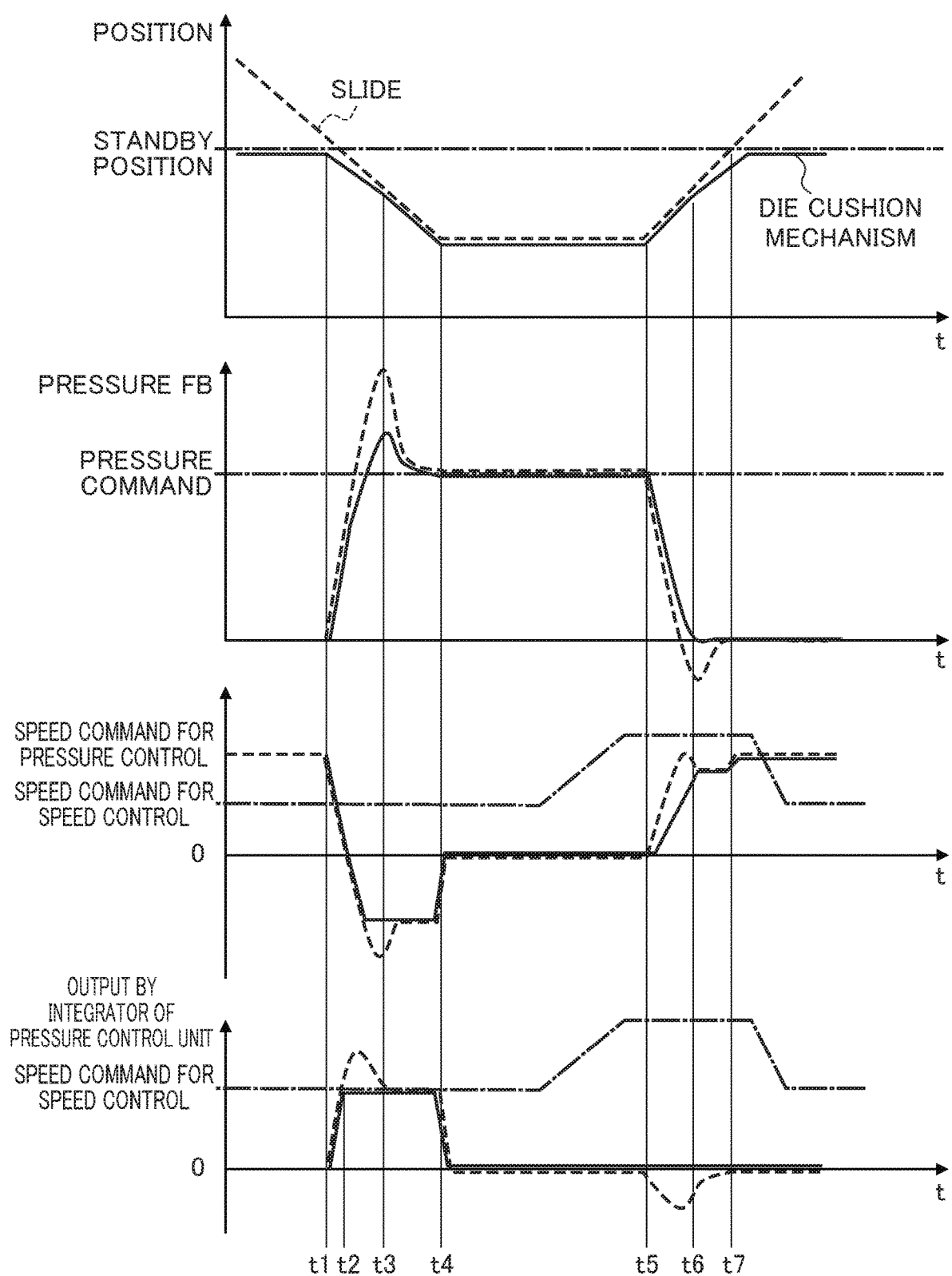
FIG. 4 is a diagram illustrating timing charts of the motor control device shown in FIG. 1.

The operation of the motor control device 1 of the present embodiment is described below with reference to FIG. 4. FIG. 4 shows the timing charts of the motor control device 1 according to the present embodiment. The first timing chart in FIG. 4 indicates the position of the slide 3 (broken line) and the position of the die cushion mechanism 4 on the bolster side (solid line). The second timing chart in FIG. 4 indicates the pressure feedback (solid line) from the pressure detection unit 22 (in other words, the pressure of the hydraulic oil in the hydraulic pressure generation mechanism 5, further in other words, the force acting on the workpiece W by the die cushion mechanism 4). The second timing chart further indicates the pressure command for pressure control (one-dot chain line) calculated by the pressure command unit 20. The third timing chart in FIG. 4 indicates the speed command for pressure control (solid line) calculated by the pressure control unit 24. The third timing chart further indicates the speed command for speed control (one-dot chain line) calculated by the speed command unit 10. The fourth timing chart in FIG. 4 indicates the output (solid line) by the integrator of the pressure control unit 24. The fourth timing chart also indicates the speed command for speed control (one-dot chain line) calculated by the speed command unit 10. It is noted that, for the sake of comparison, the second timing chart to the fourth timing chart in FIG. 4 respectively indicate the pressure feedback (broken line), the speed command for pressure control (broken line), and the output (broken line) by the integrator of the pressure control unit 24, of the case where the upper limit and the lower limit are not set in the integral operation by the pressure control unit 24.

(When Applying Pressure to Workpiece W)

First, the slide 3 is reciprocated with a predetermined stroke, and the die cushion mechanism 4 on the bolster side on which the workpiece W is mounted is made to stand by at a standby position. The workplace W is machined by the pressure generated by the contact between the slide 3 and the die cushion mechanism 4.

The die cushion mechanism 4 receives either one of the speed commands for speed control calculated by the speed command unit 10 and the pressure command for pressure control for machining the workpiece W by the pressure command unit 20. In general, the die cushion mechanism 4 is disposed below (in the ground side with respect to) the slide 3, and receives the speed command in which a value in the upward vertical direction is set as a positive value. The die cushion mechanism 4 having received a command to move in the upward vertical direction is made to stand by at the standby position by a mechanical stopper.

When the slide 3 comes into contact with the workpiece W mounted on the die cushion mechanism 4 on the bolster side (at a time t1), the pressure of the hydraulic oil in the hydraulic pressure generation mechanism 5 is kept at a predetermined pressure, and the pressure command is larger than the predetermined pressure in the hydraulic pump (in the second timing chart). The pressure control unit 24 performs control including an integral operation, for example, proportional-integral control (PI control), or proportional-integral-derivative control (PID control), on the basis of the pressure error between the pressure command and the pressure FB. At this time, the pressure FB is a predetermined pressure, while the speed command for pressure control which is calculated by the pressure control unit 24 on the basis of the pressure error between the pressure command and the pressure FB is larger than the speed command for speed control (in the third timing chart). That is, the speed command for speed control corresponds to the speed command in the direction of decreasing the pressure of the hydraulic oil in the hydraulic pressure generation mechanism 5. Accordingly, the selection unit 30 selects the speed command for speed control. At this time, the slide 3 performs a pushing operation with respect to the die cushion mechanism 4 made to stand by at the standby position, whereby the force acting on the workpiece W (that is, the pressure acting on the driven body 4) increases (in the second timing chart).

The pressure of the hydraulic oil in the hydraulic pressure generation mechanism 5, that is, the pressure FB, increases gradually, while the speed command for pressure control calculated by the pressure control unit 24 on the basis of the pressure error between the pressure command and the pressure FB decreases gradually (in the third timing chart). When the speed command for pressure control becomes smaller than the speed command for speed control, that is, when the speed command for pressure control becomes the speed command in the direction of decreasing the pressure of the hydraulic oil in the hydraulic pressure generation mechanism 5, the selection unit 30 switches from the speed command for speed control to the speed command for pressure control. Accordingly, the motor control device 1 moves the die cushion mechanism 4 on the bolster side together with the slide 3, and performs pressure control for controlling the force acting on the workpiece W (that is, the pressure acting on the driven body 4) at a constant level (at a time t3).

The forging machine has an elastic body having elastic properties between the slide 3 and the die cushion mechanism 4. The elastic body is assumed to have ideal elastic properties. In the case where the pressure control unit 24 performs pressure control without any integral (I) control, for example, proportional (P) control or proportional-derivative (PD) control, the pressure FB does not overshoot even if the pressure command changes stepwise during the pressure control. On the other hand, in order to asymptotically bring the final pressure error to zero, the pressure control unit 24 generally performs pressure control including integral (I) control, for example, proportional-integral (PI) control, or proportional-integral-derivative (PID) control. In such pressure control including integral (I) control, the pressure FB may overshoot (in the vicinity of the time t3 of the broken line in the second timing chart).

Figure 3:
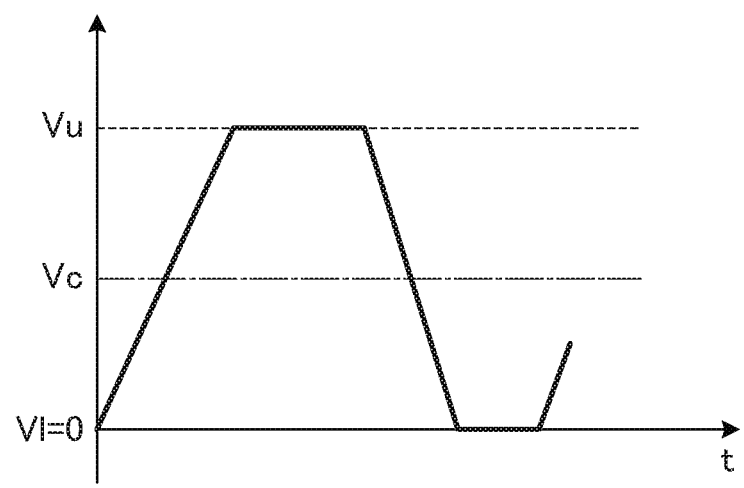
FIG. 3 is a schematic diagram illustrating an integral operation range of a pressure control unit in the motor control device shown in FIG. 1.

With regard to this point, when performing the pressure control as shown in FIG. 3, the motor control device 1 of the present embodiment limits the upper limit value Vu of the output in the integral operation by the pressure control unit 24, to the speed command for speed control. As a result, the integral operation by the pressure control unit 24 stops in the middle of increasing the pressure (at a time t2 in the fourth timing chart). After the integral operation stops, a control operation having control properties without any integral operation is performed, thereby suppressing the pressure from overshooting (in the vicinity of the time t3 of the solid line in the second timing chart). Accordingly, an excessive pressure in the hydraulic pump of the hydraulic pressure generation mechanism 5 is enabled to be avoided from being generated.

(When Releasing Pressure Having been Applied to Workpiece W)

Thereafter, the moving direction of the slide 3 is reversed (at a time t5). At this time, the speed command for speed control has already been changed (increased) by the speed command unit 10. The motor control device 1 moves the die cushion mechanism 4 on the bolster side together with the slide 3 in the opposite direction, and performs pressure control for decreasing the force acting on the workpiece W (that is, the pressure acting on the driven body 4). At this time, the pressure FB decreases, while the pressure command is kept at a constant level (in the second timing chart). Thus, the speed command for pressure control calculated by the pressure control unit 24 on the basis of the pressure error between the pressure command and the pressure FB increases (in the third timing chart).

Thereafter, the pressure FB decreases to a predetermined pressure. In the case where, at this time, the pressure control unit 24 performs pressure control including an integral (I) control operation, for example, proportional-integral (PI) control or proportional-integral-derivative (PID) control, the pressure FB may undershoot (in the vicinity of a time t6 of the broken line in the second timing chart). With regard to this point, in the present embodiment, in the case where pressure control is performed as shown in FIG. 3, the lower limit value Vl of the output in the integral operation by the pressure control unit 24 is limited to zero or above. In other words, the median Vc between the upper limit Vu in the positive direction and the lower limit Vl in the negative direction (Vc=(Vu+Vl)/2) in the integral operation by the pressure control unit 24 is set larger than zero. As a result, the integral operation by the pressure control unit 24 stops in the middle of decreasing the pressure (at the time t5 in the fourth timing chart). After the integral operation stops, a control operation having control properties without any integral operation is performed, thereby suppressing the pressure from undershooting (in the vicinity of the time t6 of the solid line in the second timing chart). Accordingly, the pressure in the hydraulic pump of the hydraulic pressure generation mechanism 5 is enabled to be avoided from decreasing to a negative value. In other words, the output in the integral operation by the pressure control unit 24 is a positive value regularly, thereby enabling to keep the driving signal for the servo motor 2 at a positive value, and thus to keep the hydraulic pressure in the hydraulic pump at a positive value.

Thereafter, when the slide 3 moves away from the workpiece W mounted on the die cushion mechanism 1 on the bolster side (at a time t7), the die cushion mechanism 4 on the bolster side on which the workpiece W is mounted is made to stand by at the standby position, and the slide 5 returns back to a predetermined position.

As described above, in the motor control device 1 of the present embodiment, when the direction of increasing the pressure in the integral operation by the pressure control unit 24 is defined as a positive direction in the integral operation, and the direction of decreasing the pressure is defined as a negative direction, the median between the upper limit in the positive direction and the lower limit in the negative direction in the integral operation by the pressure control unit 24 is larger than zero. This enables to suppress the pressure generated in the hydraulic pump of the hydraulic pressure generation mechanism 5 from undershooting. Furthermore, in the motor control device 1 of the present embodiment, the lower limit in the integral operation by the pressure control unit 24 is zero. This further enables to suppress the pressure generated in the hydraulic pump of the hydraulic pressure generation mechanism 5 from undershooting, thereby enabling to avoid the pressure in the hydraulic pump of the hydraulic pressure generation mechanism 5 from falling to a negative value. In other words, the output in the integral operation by the pressure control unit 24 is a positive value regularly, thereby enabling to keep the driving signal for the servo motor 2 at a positive value. This enables to keep the pressure in the hydraulic pump of the hydraulic pressure generation mechanism 5 at a positive value. As a result, the hydraulic pump of the hydraulic pressure generation mechanism 5 is able to be avoided from being damaged.

In the motor control device 1 of the present embodiment, the upper limit in the integral operation by the pressure control unit 24 is set to the speed command for speed control. This enables to suppress the pressure generated an the hydraulic pump of the hydraulic generation mechanism 5 from overshooting, thereby enabling to avoid the generation of an excessive pressure in the hydraulic pump of the hydraulic generation mechanism 5. As a result, the hydraulic pump of the hydraulic pressure generation mechanism 5 is enabled to be avoided from being damaged.

Figure 2:
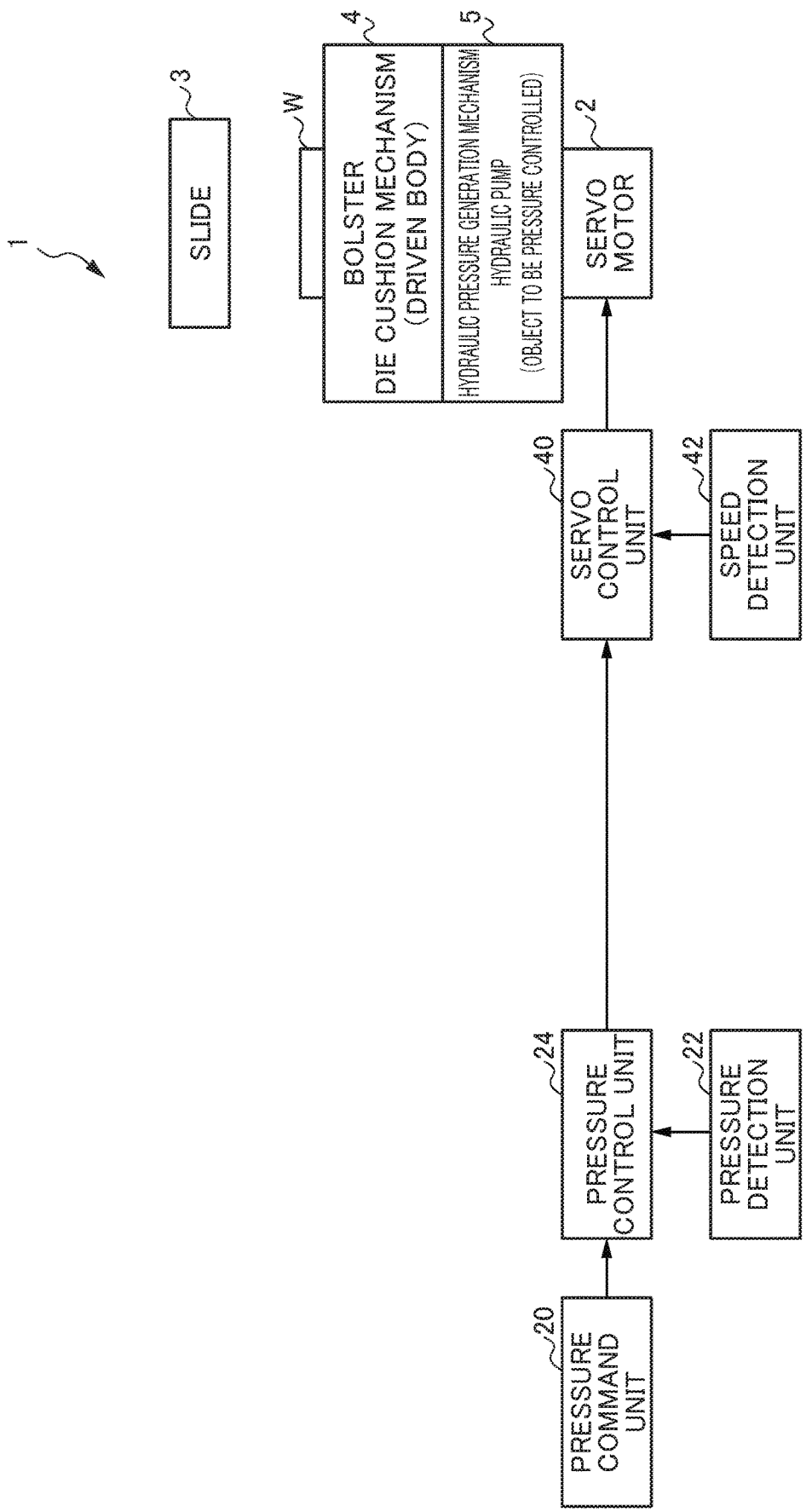
FIG. 2 is a diagram illustrating a configuration of a motor control device according to a modification of the present embodiment.

Although the embodiment of the present invention has been described so far, the present invention is not limited to the above-described embodiment. Various modifications and variations are available. In the above-described embodiment, the motor control device for performing speed control and pressure control is indicated. The features of the present invention are applicable also to a motor control device for performing only pressure control as shown in FIG. 2.

The features of the present invention are applicable also to a motor control device for performing position control and pressure control in an example, the motor control device shown in FIG. 1 includes a position command unit and a position control unit in place of the speed command unit 10. The position command unit calculates a position command (a position command for position control) for commanding a rotation position of the servo motor 2 (in other words, a position of the driven body 4). The position command unit calculates the position command for position control in accordance with the program or the command input by a host control device, an external input device or the like not shown. The position control unit calculates a speed command for position control for the servo motor 2, on the basis of the position command calculated by the position command unit and the position FB detected by a position detection unit (for example, an encoder disposed in the servo motor 2) 42. Specifically, the position control unit calculates the position error between the position command calculated by the position command unit and the position FB detected by the position detection unit 42, and performs PI control to the position error, thereby calculating the speed command for position control. The selection unit 30 switches between position control and pressure control by selecting either one of position control and pressure control. Specifically, the selection unit 30 compares the speed command for position control calculated by the position control unit and the speed command for pressure control calculated by the pressure control unit 24, and selects the smaller one. That is, the selection unit 30 selects the speed command in the direction of decreasing the pressure of the hydraulic oil in the hydraulic pressure generation mechanism 5.

In the above-described embodiment, the motor control device for driving the die cushion mechanism 4 on the bolster side has been indicated. The features of the present invention are also applicable to a motor control device in which the bolster is fixed and the slide 3 is driven.

In the above-described embodiment, the motor control device has been indicated, which performs pressure control, by using the hydraulic pressure generation mechanism 5 configured with the hydraulic pump and the hydraulic cylinder for driving the slide 3 or the die cushion mechanism 4 on the bolster side, and also using the servo motor 2 for driving the hydraulic pump in the hydraulic pressure generation mechanism 5 so as to control the servo motor 2. The present invention is not limited thereto. In an example, the features of the present invention are applicable also to a motor control device for performing pressure control by using a ball screw for driving the slide 3 or the die cushion mechanism 4 on the bolster side, and also using the servo motor 2 for driving the ball screw, so as to control the servo motor 2. In this case, in the motor control device, the driven body (the slide 3 or the die cushion mechanism 4 on the bolster side) may be regarded as the object to be pressure controlled, and the pressure acting on the driven body (that is, the force acting on the workpiece W) may be controlled as the pressure generated in the object to be pressure controlled. Even in this configuration, when the direction of increasing the pressure in the integral operation by the pressure control unit 24 is defined as a positive direction in the integral operation, and the direction of decreasing the pressure is defined as a negative direction, the median Vc between the upper limit Vu in the positive direction and the lower limit V1 in the negative direction (Vc=(Vu+V1)/2) in the integral operation by the pressure control unit 24 may be set larger than zero, as shown in FIG. 5. In other words, a maximum absolute value |V1| of the output in the integral operation by the pressure control unit 24 at the time when the speed command in the negative direction of decreasing the pressure generated in the hydraulic pump of the hydraulic pressure generation mechanism 5 is calculated may be set smaller than a maximum absolute value |Vu| of the output in the integral operation by the pressure control unit 24 at the time when the speed command in the positive direction of increasing the pressure generated in the hydraulic pump of the hydraulic pressure generation mechanism 5 is calculated. This enables to suppress the pressure generated in the object to be pressure controlled from undershooting.

In the above-described embodiment, the upper limit Vu in the integral operation by the pressure control unit 24 is set to the speed command for speed control, or alternatively may be set changeably according to a usage condition. In an example, in the case where the overshooting of the pressure generated in the object to be pressure controlled needs to be suppressed, the upper limit Vu in the integral operation by the pressure control unit 24 may be set to the speed command for speed control as described above, while in the case where responsiveness is required in pressure control, the upper limit Vu in the integral operation by the pressure control unit 24 may be set larger than the speed command for speed control. The upper limit Vu in the integral operation by the pressure control unit 24 may be set on the basis of the command input by, for example, a host control device, an external input device or the like not shown.

EXPLANATION OF REFERENCE NUMERALS

1 MOTOR CONTROL DEVICE
2 SERVO MOTOR
3 SLIDE
4 DIE CUSHION MECHANISM ON BOLSTER SIDE (DRIVEN BODY)
5 HYDRAULIC PRESSURE GENERATION MECHANISM (HYDRAULIC PUMP)
10 SPEED COMMAND UNIT
20 PRESSURE COMMAND UNIT
22 PRESSURE DETECTION UNIT

24 PRESSURE CONTROL UNIT
30 SELECTION UNIT
40 SERVO CONTROL UNIT
42 SPEED DETECTION UNIT (POSITION DETECTION UNIT)
W WORKPIECE (OBJECT)

What is claimed is:

1. A motor control device configured to control a servo motor configured to drive an object to be pressure controlled, the motor control device performing pressure control for controlling pressure generated in the object to be pressure controlled, the motor control device comprising:
   a pressure command unit configured to calculate a pressure command for commanding the pressure generated in the object to be pressure controlled;
   a pressure detection unit configured to detect the pressure generated in the object to be pressure controlled;
   a pressure control unit configured to calculate a speed command for the pressure control for the servo motor, on a basis of the pressure command calculated by the pressure command unit and the pressure detected by the pressure detection unit; and
   a servo control unit configured to control speed of the servo motor, on a basis of the speed command for the pressure control calculated by the pressure control unit, wherein
   the pressure control unit performs an integral operation, and
   when a direction of increasing pressure in the integral operation is defined as a positive direction in the integral operation, and a direction of decreasing the pressure is defined as a negative direction, a median between an upper limit in the positive direction and a lower limit in the negative direction in the integral operation is larger than zero.

2. The motor control device according to claim 1, wherein the lower limit in the integral operation by the pressure control unit is zero.

3. The motor control device according to claim 1, wherein the upper limit in the integral operation by the pressure control unit is set changeably.

4. The motor control device according to claim 3, the motor control device further comprising:
   a speed command unit configured to calculate a speed command for speed control for the servo motor; and
   a selection unit configured to select a speed command in the direction of decreasing the pressure generated in the object to be pressure controlled from the speed command for speed control calculated by the speed command unit and the speed command for pressure control calculated by the pressure control unit, wherein
   the servo control unit controls the speed of the servo motor, on a basis of the speed command selected by the selection unit.

5. The motor control device according to claim 4, wherein the upper limit in the integral operation by the pressure control unit is set to the speed command for speed control.

6. The motor control device according to claim 1, wherein
   the object to be pressure controlled is a hydraulic pressure generation mechanism configured with a hydraulic pump to be driven by the servo motor and a hydraulic cylinder to be driven with hydraulic oil supplied by the hydraulic pump so as to drive a driven body, and
   the pressure generated in the object to be pressure controlled corresponds to hydraulic pressure of the hydraulic oil in the hydraulic pressure generation mechanism.

* * * * *